United States Patent
Kulkarni et al.

(10) Patent No.: US 10,089,114 B2
(45) Date of Patent: Oct. 2, 2018

(54) MULTIPLE INSTRUCTION ISSUANCE WITH PARALLEL INTER-GROUP AND INTRA-GROUP PICKING

(71) Applicant: QUALCOMM Incorporated, San Diego, CA (US)

(72) Inventors: Milind Ram Kulkarni, Raleigh, NC (US); Rami Mohammad A. Al Sheikh, Morrisville, NC (US); Raguram Damodaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 15/086,052

(22) Filed: Mar. 30, 2016

(65) Prior Publication Data

US 2017/0286120 A1 Oct. 5, 2017

(51) Int. Cl.
G06F 9/38 (2018.01)
G06F 9/30 (2018.01)

(52) U.S. Cl.
CPC .......... G06F 9/3851 (2013.01); G06F 9/3005 (2013.01); G06F 9/3836 (2013.01); G06F 9/3838 (2013.01)

(58) Field of Classification Search
CPC ............................. G06F 9/3838; G06F 9/3836
USPC ......................................................... 712/215
See application file for complete search history.

(56) References Cited

U.S. PATENT DOCUMENTS

| 7,430,653 | B1 | 9/2008 | Tremblay |
| 8,275,976 | B2 | 9/2012 | Glew |
| 8,656,401 | B2 * | 2/2014 | Venkataramanan .. G06F 9/3012 718/103 |
| 8,769,246 | B2 | 7/2014 | Golla |
| 9,129,060 | B2 * | 9/2015 | Ansari ................... G06F 13/362 |
| 2007/0074005 | A1 | 3/2007 | Abernathy et al. |
| 2011/0276784 | A1 | 11/2011 | Gewirtz et al. |
| 2012/0144393 | A1 | 6/2012 | Vinh et al. |
| 2012/0278593 | A1 | 11/2012 | Clark et al. |
| 2012/0291037 | A1 * | 11/2012 | Venkataramanan .. G06F 9/3012 718/103 |

(Continued)

FOREIGN PATENT DOCUMENTS

CN 104657114 A 5/2015
EP 3065050 A2 9/2016

OTHER PUBLICATIONS

International Search Report and Written Opinion—PCT/US2017/020938—ISA/EPO—Jun. 9, 2017.

*Primary Examiner* — Yuqing Xiao
(74) *Attorney, Agent, or Firm* — Muncy, Geissler, Olds & Lowe, P.C./QUALCOMM

(57) ABSTRACT

A scheduler with a picker block capable of dispatching multiple instructions per cycle is disclosed. The picker block may comprise an inter-group picker and an intra-group picker. The inter-group picker may be configured to pick multiple ready groups when there are two or more ready groups among a plurality of groups of instructions, and pick a single ready group when the single ready group is the only ready group among the plurality of groups. The intra-group picker may be configured to pick one ready instruction from each of the multiple ready groups when the inter-group picker picks the multiple ready groups, and to pick multiple ready instructions from the single ready group when the inter-group picker picks the single ready group.

31 Claims, 11 Drawing Sheets

(56) References Cited

U.S. PATENT DOCUMENTS

| | | |
|---|---|---|
| 2013/0042089 A1 | 2/2013 | Vinh et al. |
| 2013/0339679 A1 | 12/2013 | Iyer et al. |
| 2014/0109098 A1* | 4/2014 | Sato ............... G06F 9/3836 718/102 |
| 2014/0122848 A1 | 5/2014 | Easwaran et al. |
| 2015/0106595 A1* | 4/2015 | Khot ............... G06F 9/3836 712/215 |
| 2016/0259648 A1* | 9/2016 | Di .................. G06F 9/3836 |

* cited by examiner

MULTIPLE INSTRUCTION ISSUANCE WITH PARALLEL INTER-GROUP AND INTRA-GROUP PICKING

REFERENCE TO CO-PENDING APPLICATIONS FOR PATENT

The present Application for Patent may be related to the following co-pending U.S. patent application Ser. No. 15/860,049 entitled "APPARATUS AND METHOD FOR DYNAMIC POWER REDUCTION IN A UNIFIED SCHEDULER" filed concurrently herewith on Mar. 30, 2016, assigned to the assignee hereof, and expressly incorporated by reference herein.

FIELD OF DISCLOSURE

Various aspects described herein relate to processors, and more particularly, to multi-instruction schedulers in processors.

BACKGROUND

A scheduler is an important component of a processor, and can significantly impact the performance and frequency of a processor core. The performance can be in terms of IPC (instructions per cycle) and the frequency can be in terms of a critical path. FIG. 1 illustrates a structure of a conventional scheduler 100. As seen, the scheduler 100 includes an instruction silo 110, a wakeup block 120, and a picker block 130. Both the wakeup block 120 and the picker block 130 are typically implemented as matrices.

The scheduler 100 can be viewed as a part of the processor core where instructions wait to be dispatched into execution lanes. The following operations—allocation, picking, and wakeup—are associated with the scheduler 100. Before an instruction can be executed, it is initially allocated into the instruction silo 110. Multiple instructions can be allocated. That is, the instruction silo 110 can hold some number of instructions, and every issued instruction is allocated a row.

A primary purpose of the wakeup block 120 is to identify instructions that are ready for execution. An instruction can be ready when all operands of that instruction are available. A ready instruction can bid for grants, i.e., bid for execution privileges. Multiple ready instructions can bid simultaneously, e.g., in the same cycle. The picker block 130 picks or selects one or more ready instructions and grants permission(s) to the selected instruction(s) for dispatch to execution units (e.g., adder, multiplier, shifter, etc.) for execution.

Note that in FIG. 1, there is a "scheduler loop" between the wakeup block 120 and the picker block 130. The scheduler loop includes bids in the direction from the wakeup block 120 to the picker block 130 and grants in the direction from the picker block 130 to the wakeup block 120. The scheduler loop is due to dependencies among the instructions. For example, consider two instructions X=A+B and Y=X+C. In this instance, the second instruction Y=X+C is dependent on the first instruction X=A+B since the operand X of the second instruction is provided by the execution of the first instruction.

FIG. 2 illustrates an example of a picker block 130 implemented as a matrix. A job of the picker block 130 is to arbitrate among bidding instructions. One criteria for arbitration can be age of the instruction. For example, older instructions may be prioritized over newer instructions. In this implementation, it is assumed that instructions are divided into groups. This means that priorities should be maintained between the groups. In the picker matrix, each group owns an arbitration column through which it kills grants to instructions newer than that group. The picking operation can be split into two parts—inter-group picking and intra-group picking. In the inter-group picking, the oldest group is picked. In the intra-group picking, the oldest instruction within the group is picked.

In FIG. 2, inter-group arbitration is illustrated. In this figure, it is assumed that instructions I0, I1 and I2 respectively belong to instruction groups (or simply "group") G0, G1 and G2. It is also assumed that G2 is older than G1 which is older than G0. In other words, the age priority among these groups can be expressed as G2 >G1 >G0. In the picker matrix, every instruction has a row and every group has a column. For each cell of the picker matrix, an age bit of that cell that indicates whether the instruction assigned to this row is newer (value 1) or not newer (value 0) than the group assigned to this column. For convenience, each cell will be addressed as a (row, column) pair. Since G2 is older than both G1 and G0, the age bits of cells (I0, G2) and (I1 G2) are both "1". Also, since G1 is older than G0, the age bit of cell (I0, G1) is "1".

Now assume that in a cycle, both I0 and I2 are bidding (indicated through thick lines). The columns of corresponding groups G0 and G2 are also asserted (also indicated as thickened lines) since I0 and I2 belong to groups G0 and G2. These column lines are also referred to as "conflict" lines. Since I0 belongs to G0 that is newer than G2 (age bit of cell (I0, G2) is 1), G2 kills the grant to I0 (as indicated by "X" at the I0 and G2 intersection). On the other hand, the grant to I2 is not killed.

As mentioned, FIG. 2 illustrates inter-group arbitration in which the oldest group is selected. But recall that there is also intra-group arbitration for each group of instructions. Once the oldest group is selected, the intra-group picker selects the oldest instruction within the oldest group.

FIG. 3 illustrates a circuit detailing a cell of the picker block 130 of FIG. 2. In FIG. 3, it is assumed that a signal is set/reset (asserted/not asserted) when the voltage of the signal line is high/low. During a cycle, the grant lines of instructions are subjected to two phases—precharge and evaluation. During the precharge phase, the grant line for each instruction is precharged to high. During the evaluation phase, each instruction is evaluated. If the evaluation determines that the instruction should not be granted, the grant line is discharged. In other words, if the instruction grant evaluates to false, the grant line is pulled down. FIG. 3 shows multiple paths through which a grant line is evaluated. As seen, there are three pull-down conditions for grant of an instruction:

- the instruction is not ready (~ready_clk signal);
- the instruction does not belong to the oldest group (conflict_in signal); and
- the instruction is not the oldest instruction within the group (kill_in signal).

In the wakeup block 120, a granted instruction can wake up its dependents, and the dependent instruction can bid in the next cycle. FIG. 4 illustrates an example of this dependency wakeup approach in which the wakeup block 120 is implemented as a matrix with instructions I0, I1 and I2 with the critical path shaded (explained further below). This wakeup matrix includes one row and one column for each instruction. For each cell, a dependency bit of that cell that indicates whether the instruction assigned to this row is dependent on the instruction assigned to this column. For convenience, each cell will be addressed as a (row, column)

pair. In this instance, it is assumed that I1 is dependent on I2 illustrated with the dependency bit of cell (I1, I2) being set.

In FIG. 4, it is also assumed that the grant line for I0 is asserted, i.e., the picker (not shown) has granted I0 for dispatch as indicated by the blocking of the "I0 grant" row. Each granted instruction announces or broadcasts that it has been granted as indicated by blocking of the "I0 broadcast" column. For each instruction dependent on the granted instruction, the dependency is cleared, which is indicated by the transition of the bit cell value from "1" to "0". Effectively, the broadcast resets all dependency bits along that column. In this figure, the dependency bits of cells (I1 I0) and (I2, I0) are cleared. When all dependency bits are cleared for an instruction, that instruction is ready and bids for execution in the next cycle. For example, note that I2 has no more remaining dependencies after the grant to I0. This means that I2 can bid in the next cycle as indicated by the blocking of the "I2 bid" row via the dependency bit of cell (I2, I0). On the other hand, I1 is not yet ready since its dependency on I2 remains even after the grant to I0. Therefore, I1 will not bid in the next cycle.

For performance, it is desirable to have a single scheduler with a large window size. Unfortunately, a big scheduler may not be able to achieve the frequency requirements, and thus limit the frequency of the processor core. A conventional solution to this problem is to divide instructions among multiple single-instruction pickers as illustrated in FIG. 5. In this figure, the scheduler 500 includes a wakeup block 520, multiple picker blocks 530 (530-1, 530-2, 530-3, 530-4), and four execution units XUs 540 (540-1, 540-2, 540-3, 540-4). Each picker block 530 selects a single instruction per cycle for execution in its corresponding execution unit 540. Such a conventional solution with plural single-instruction pickers would require that instructions be divided up among the picker blocks 530 and each picker block 530 can pick an instruction for execution per cycle. Then theoretically, there can be as many as four instructions being executed simultaneously.

Unfortunately, such division of instructions can cause problems due to fragmentation. This can lead to uneven distribution of ready instructions among the picker blocks 530. For example, the picker block 530-1 may have two ready instructions, and the picker block 530-2 may have no ready instructions. This means that between the picker blocks 530-1 and 530-2, only one instruction can be dispatched (from the picker block 530-1) for execution during a cycle. In such a scenario, there can be ready instructions that are not dispatched even though there are free execution lanes.

SUMMARY

This summary identifies features of some example aspects, and is not an exclusive or exhaustive description of the disclosed subject matter. Whether features or aspects are included in, or omitted from this Summary is not intended as indicative of relative importance of such features. Additional features and aspects are described, and will become apparent to persons skilled in the art upon reading the following detailed description and viewing the drawings that form a part thereof.

One or more aspects are directed to a scheduler. The scheduler may comprise an inter-group picker and an intra-group picker. The inter-group picker may be configured to pick multiple ready groups when there are two or more ready groups among a plurality of groups, and pick a single ready group when the single ready group is the only ready group among the plurality of groups. A ready group may be a group that has one or more ready instructions. The intra-group picker may be configured to pick one ready instruction from each of the multiple ready groups when the inter-group picker picks the multiple ready groups, and pick multiple ready instructions from the single ready group when the inter-group picker picks the single ready group.

One or more aspects are directed to a method of picking instructions in a scheduler. The method may comprise picking ready groups and picking ready instructions. When picking the ready groups, multiple ready groups may be picked when there are two or more ready groups among a plurality of groups, and a single ready group may be picked when the single ready group is the only ready group among the plurality of groups. A ready group may be a group that has one or more ready instructions. When picking the ready instructions, one ready instruction from each of the multiple ready groups may be picked when the multiple ready groups are picked, and multiple ready instructions may be picked from the single ready group when the single ready group is picked.

One or more aspects are directed to a scheduler. The scheduler may comprise means for inter-group picking and means for intra-group picking. The means for inter-group picking may be configured to pick multiple ready groups when there are two or more ready groups among a plurality of groups, and may be configured to pick a single ready group when the single ready group is the only ready group among the plurality of groups. A ready group may be a group that has one or more ready instructions. The means for intra-group picking may be configured to pick one ready instruction from each of the multiple ready groups when the means for inter-group picking picks the multiple ready groups, and may be configured to pick multiple ready instructions from the single ready group when the means for inter-group picking picks the single ready group.

One or more aspects are directed to a computer-readable medium having a code recorded thereon that may cause a computer to perform a method of picking instructions in a scheduler. The method may comprise picking ready groups and picking ready instructions. When picking the ready groups, multiple ready groups may be picked when there are two or more ready groups among a plurality of groups, and a single ready group may be picked when the single ready group is the only ready group among the plurality of groups. A ready group may be a group that has one or more ready instructions. When picking the ready instructions, one ready instruction from each of the multiple ready groups may be picked when the multiple ready groups are picked, and multiple ready instructions may be picked from the single ready group when the single ready group is picked.

BRIEF DESCRIPTION OF THE DRAWINGS

The accompanying drawings are presented to aid in the description of embodiments and are provided solely for illustration of the embodiments and not limitation thereof.

DETAILED DESCRIPTION

Examples are disclosed in the following description and related drawings directed to specific embodiments of one or more aspects of the present disclosure. Alternate embodiments may be devised without departing from the scope of the discussion. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
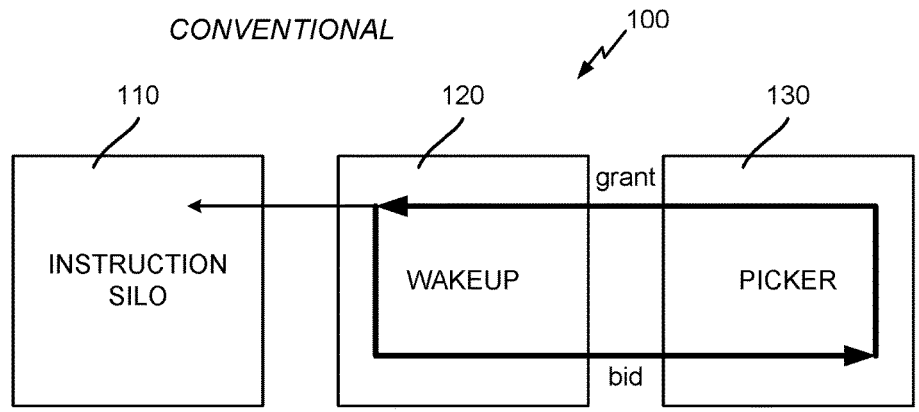
FIG. 1 illustrates a structure of a scheduler.
Figure 2:
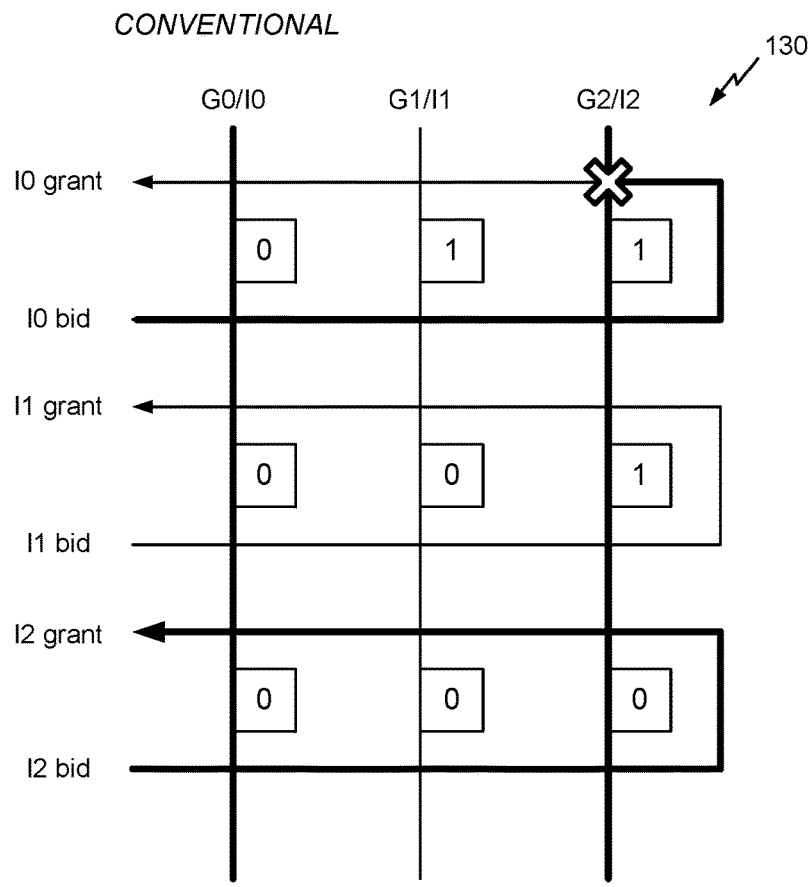
FIG. 2 illustrates a picker block of a scheduler implemented as a matrix.
Figure 3:
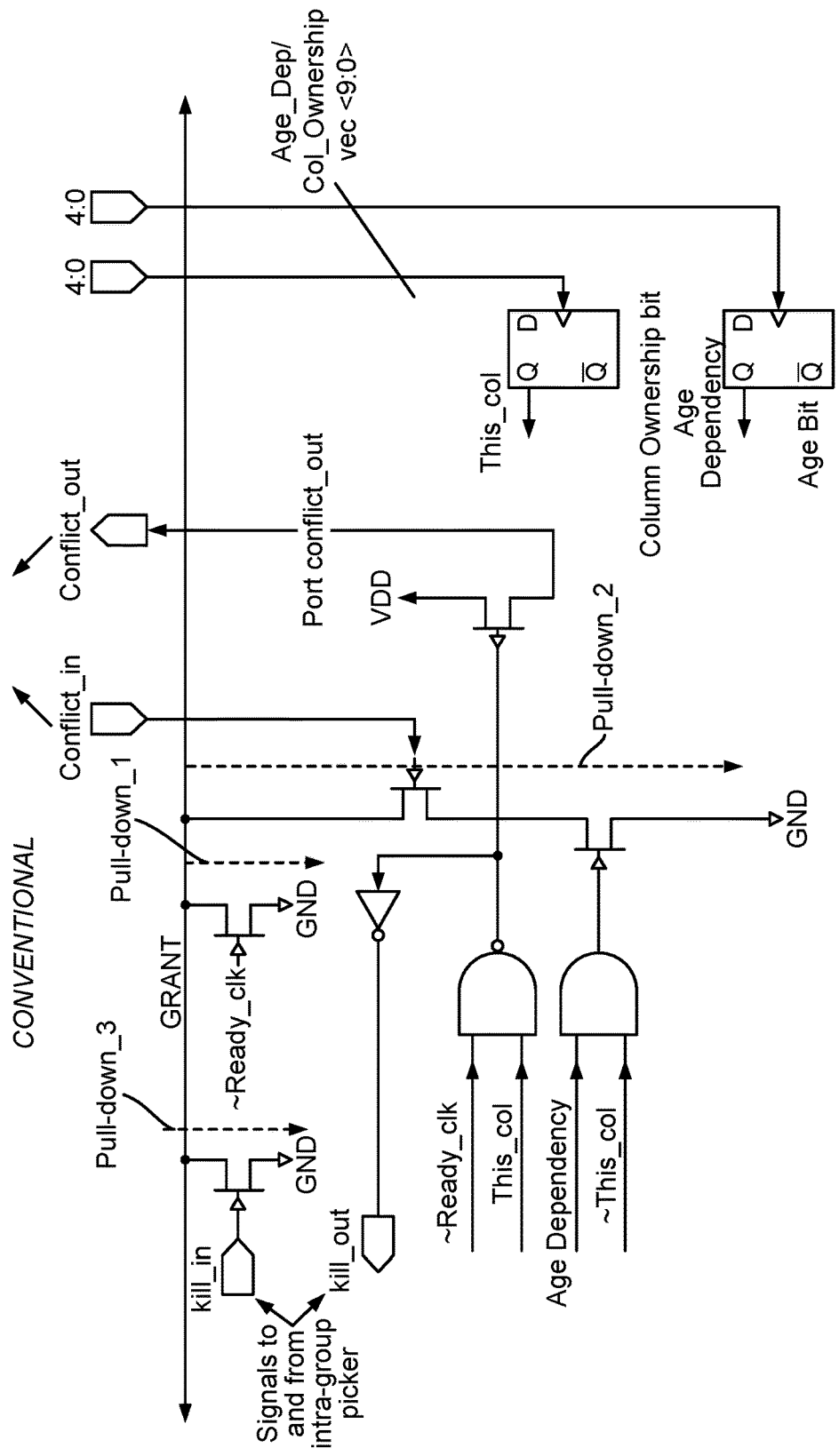
FIG. 3 illustrates a circuit of a cell of a picker block of a scheduler.
Figure 4:
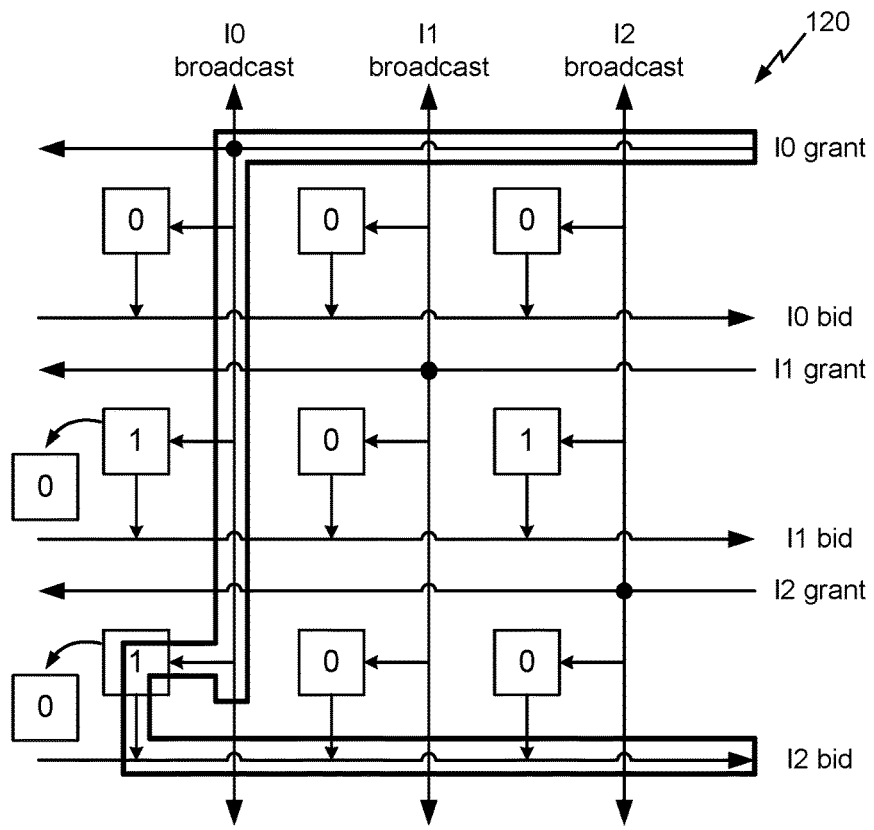
FIG. 4 illustrates a wakeup block of a scheduler implemented as a matrix.
Figure 5:
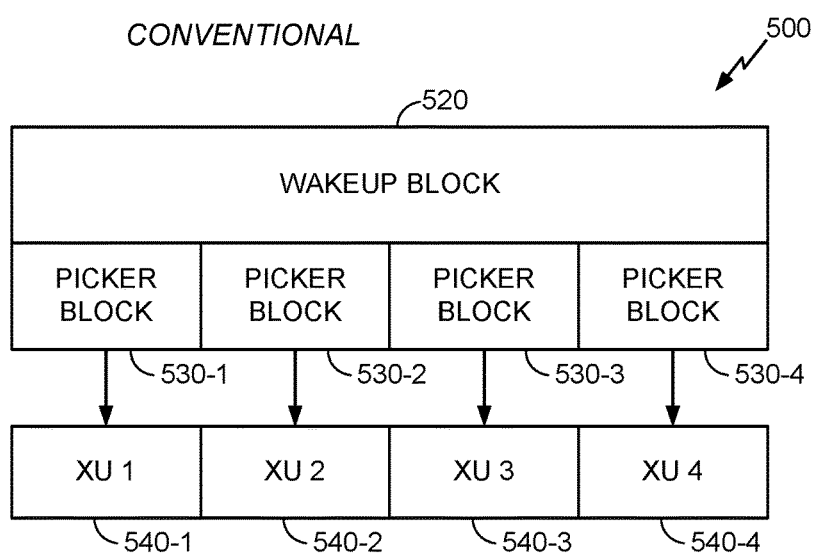
FIG. 5 illustrates a structure of a scheduler with plural single instruction per cycle picker blocks.

As mentioned, one (of which there can be several) disadvantage of the conventional scheduler 500 illustrated in FIG. 5 is that there can be ready instructions that are not dispatched even though there are free execution lanes. This is due in large part to the fragmentation of instructions and to each picker block 530 being able to dispatch only a single instruction per cycle.

In one or more aspects of the disclosure, a picker block that is able to dispatch multiple instructions per cycle is proposed. That is, the proposed picker block can be configured to dispatch N instructions per cycle, where N≥2. Recall that instructions can be divided into a plurality of groups and that ready instructions can be dispatched. Thus, the phrase "ready group" may be used to refer any group having one or more ready instructions. In an aspect of the disclosure, an order of dispatch may be as follows:

When there are M ready groups (i.e., M groups have ready instructions) where M≥N, pick N ready groups and pick one instruction from each chosen ready group;

When there are M ready groups where M<N, pick at least one instruction from each of the M ready groups up to a total of N instructions.

Figure 6:
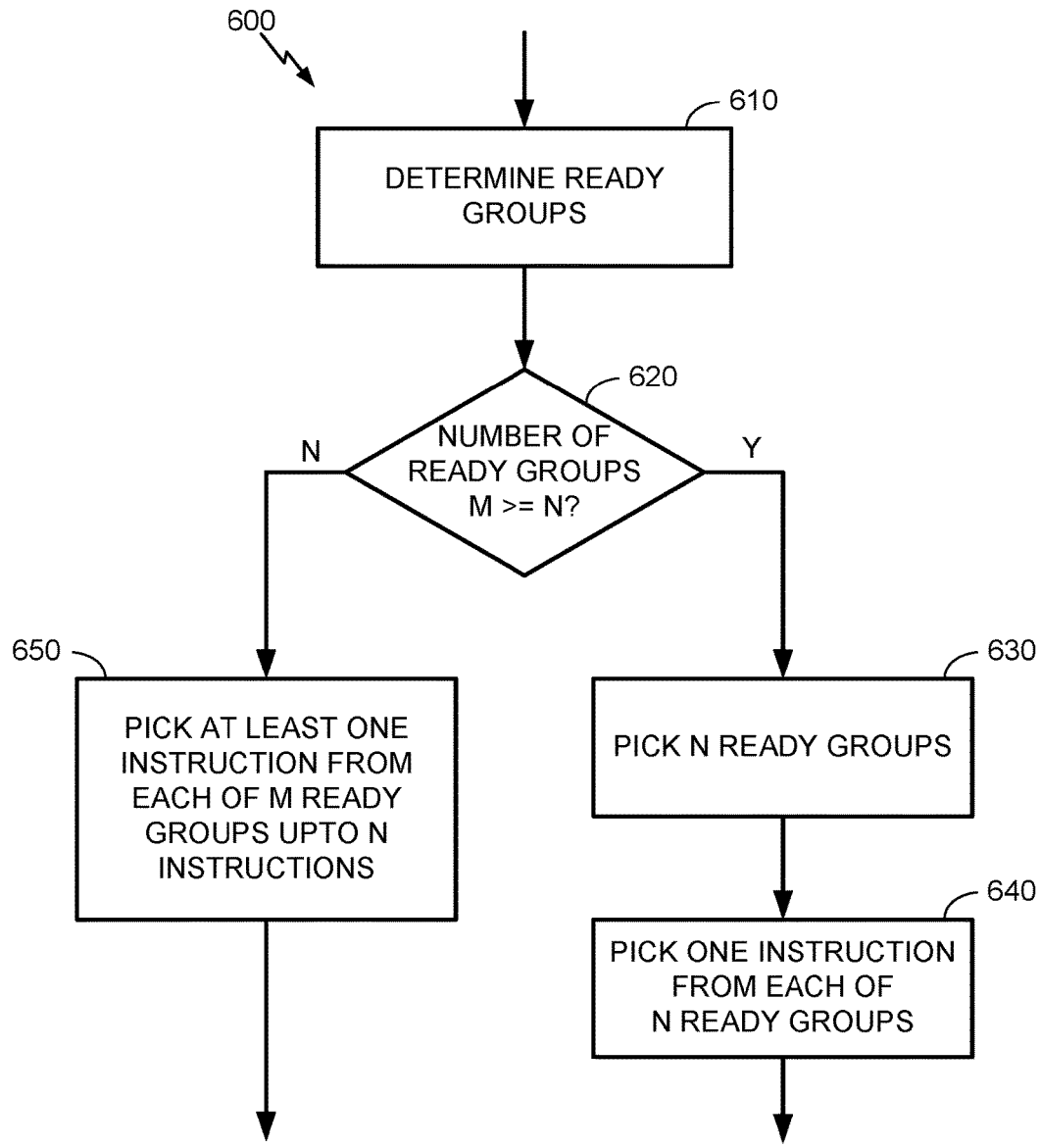
FIG. 6 illustrates a flow chart of a method performed by a picker block to dispatch multiple instructions per cycle according to a non-limiting aspect of the disclosure.

FIG. 6 illustrates a flow chart of the above instruction dispatching implementation that may be performed by the proposed picker block. In 610, the picker block may determine the ready groups among the plurality of groups. In 620, the picker block may determine whether or not there are at least N ready groups. If so, the picker block may pick N ready groups in 630, and may pick one ready instruction from each of the N ready groups in 640. If there are less than N ready groups, then in 650, the picker block may pick one or more ready instructions from each ready group up to a total of N ready instructions.

For explanation purposes, a picker block capable of dispatching two (i.e., N=2) instructions in one cycle is described. But it should be noted that for those skilled in the art, it would be a straight forward process to implement picker blocks capable of dispatching more than two instructions in one cycle. In an aspect of the disclosure, the proposed picker block may be implemented as a matrix, and may be divided into one or more inter-group pickers and one or more intra-group pickers. The proposed picker block may implement the following to dispatch two instructions per cycle:

When there are two or more ready groups among a plurality of groups (each of two or more ready groups has one or more ready instructions), pick two ready groups and pick one instruction each of the chosen ready groups;

When there is only a single ready group (i.e., there are no other ready groups), pick one instruction (if there in only one ready instruction) or two instructions (if there are two or more ready instructions) from the single ready group.

In this way, when there are plural ready instructions, then two instructions will always be dispatched. Note that the word the phrases "two ready groups" and "two instructions" can be replaced with "multiple ready groups" and "multiple instructions". Thus, the scope of the disclosure is not limited to "two".

Figure 7:
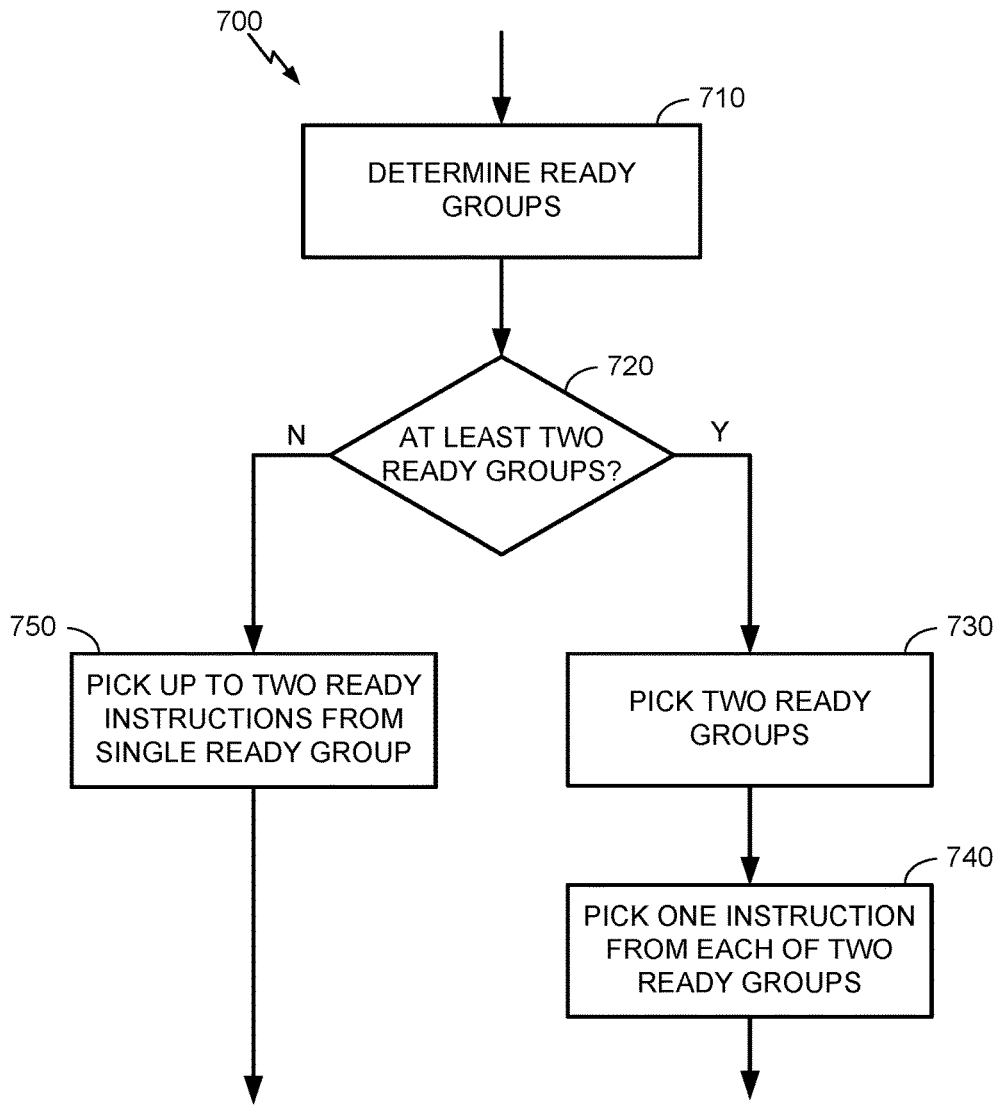
FIG. 7 illustrates a flow chart of a method performed by a picker block to dispatch two instructions per cycle according to a non-limiting aspect of the disclosure.

FIG. 7 illustrates a flow chart for two instructions per cycle dispatch operation that may be performed by the proposed picker block. In 710, the picker block may determine the ready groups among the plurality of groups. In 720, the picker block may determine whether or not there are at least two ready groups. If so, the picker block may pick two ready groups in 730, and may pick one ready instruction from each of the two ready groups in 740. If there is only a single ready group, then in 750, the picker block may up to two ready instructions from the single ready group.

The picking of the groups and/or instructions can be based on one or more priorities or factors. For explanation purposes, age will be used as an example of such a factor. However, for one skilled in the art, it would be a straight forward process to include considerations of any combination of any number of factors. When there are two or more ready groups among the plurality of groups, there can be plural ways to pick the two ready groups. Note that any two ready groups may be picked. For example, the oldest and newest of the ready groups may be picked.

There can also be plural ways to pick an instruction from each of the two ready groups. In one aspect of the disclosure, the choice may be random, i.e., any one ready instruction from each of the ready groups may be picked. In another aspect of the disclosure, the instructions may be picked in an order of priority such as from an oldest ready instruction to a newest ready instruction. When this order of priority is implemented, then the oldest instruction from each of the chosen ready groups may be chosen.

When there is only a single ready group and the single ready group has two or more ready instructions, there can be plural ways to pick two ready instructions from the single ready group. Again, the choices may be random. But if the instructions are picked based on the priority from oldest to newest, the two oldest ready instructions of the single ready group may be picked.

A discussion regarding ages of instructions and groups may be helpful at this juncture. The following discusses just some of the way ages of instructions and/or groups may be determined. This is merely to provide some context for understanding, and should not be not be considered as being exhaustive. From one perspective, an instruction's age may be determined based on its allocation. For example, between two instructions allocated into the instruction silo, the earlier allocated instruction may be considered to be older. From another perspective, the instruction's age may be determined even before it is allocated. For example, the instruction's age may be determined at the front-end stage, at the renaming stage, or at the register access stage of a processor core.

In one aspect of the disclosure, the relative ages of the instructions may be implied by the rows they occupy in the scheduler, e.g., in the instruction silo. In one approach, the instructions may be arranged so that between any two rows, the lower row instruction is at least as old as the upper row instruction. If this approach is implemented, then the uppermost instruction would be the newest instruction and the bottommost instruction would be the oldest. Of course, this is not the only approach that can be implemented, and one skilled in the art would find it straightforward to implement other approaches (e.g., oldest at the top).

For a group, the group's age may be based on age(s) of the instruction(s) in that group. For example, the oldest instruction's age may be considered as the group's age. Alternatively, the newest instruction's age may be considered as the group's age. In some circumstances, the age of the absolute oldest/newest instruction of the group may be used. But in other circumstances, the age of the oldest/newest ready instruction of the group may be used. For example, the ready instructions may be used when determining ages among the ready groups.

Note that the instructions may be grouped such that between any older and newer group, none of the instructions in the older group is newer than any of the instructions in the newer group. If the oldest instructions occupy the lowest rows of the scheduler and the newest instructions occupy the highest rows, then simply by grouping the instructions by consecutive rows, it can be guaranteed that an older group has no instructions newer than instructions of a newer group. This can be useful when implementing intra-group pickers (discussed further below).

Figure 8:
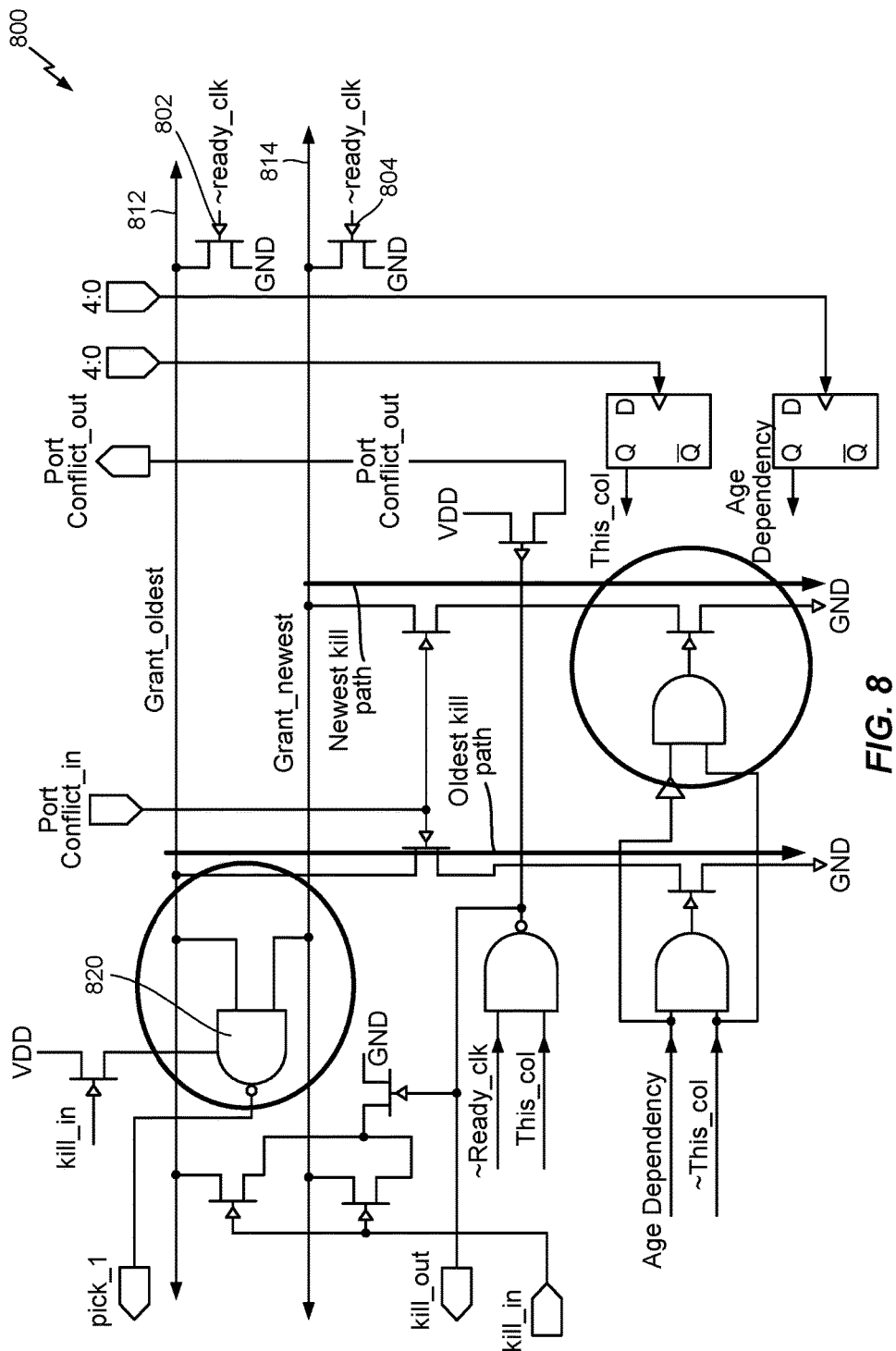
FIG. 8 illustrates a circuit of a cell of a picker block according to a non-limiting aspect of the disclosure.

FIG. 8 illustrates a cell 800 of a picker block. In this figure, it is assumed that a signal is set/reset (asserted/cleared) when the voltage of the signal line is high/low. However, this should not be taken to be limiting. One skilled in the art would realize that same or similar logic may be implemented in a variety of ways, e.g., currents, magnetic fields, and so on). The cell 800 may be configured to perform inter-group arbitration. An inter-group picker may comprise one or more cells 800. While not shown in FIG. 8, it can be assumed that there is a global grant line shared between all pickers.

When there are two or more ready groups, the proposed inter-group picker may pick multiple (e.g., two) groups. For example, the oldest ready group and the newest ready group may be picked. In FIG. 8, the cell 800 may comprise grant old line 812 and a grant new line 814 to enable the oldest and the newest ready groups to be picked. It should be understood that the grant old and grant new lines 812, 814 may be provided per picker per row, i.e., per instruction.

These lines may undergo two phases—the precharge phase and the evaluation phase. The grant old line 812 of the oldest group would remain high on evaluate. Similarly, the grant new line 814 of the newest group would also remain high on evaluate. This means that if either of the grant old and the grant new lines 812, 814 remains high, then the instruction associated with the cell 800 can be dispatched.

In particular, assuming that the instruction is ready (the transistors 802, 804 are oft), the grant old line 812 can be set (e.g., remain high after the precharge) when the group associated with the cell 800 is the oldest of the ready groups. Similarly, the grant new line 814 can be set (e.g., remain high after precharge) when the group associated with the cell 800 is the newest of the ready groups. The cell 800 may include an indicator 820 (e.g., implemented as a NAND gate) which takes signals from the grant old and the grant new lines 812, 814 to output a pick_1 signal. Note that the pick_1 signal implicitly indicates the number of groups that are ready in any cycle. This pick_1 signal can be provided to an intra-group picker (discussed below) to indicate if a single instruction is to be picked. While not shown, the global grant line may be killed when both the grant old and the grant new lines 812, 814 are pulled down since this means that the associated group is neither the oldest nor the newest ready group.

From one cycle to the next, the following statement may be made. A first ready instruction of an existing oldest group on the grant old line can be replaced by a second instruction of a group that is older than the existing oldest group. For example, dependencies may be resolved after the one cycle to allow the second instruction to bid in the next cycle. Conversely, a first ready instruction of an existing newest group can be replaced by a second ready instruction of a group that is newer than the newest existing group. For example, the second instruction may have been allocated later than the first instruction.

Figure 9:
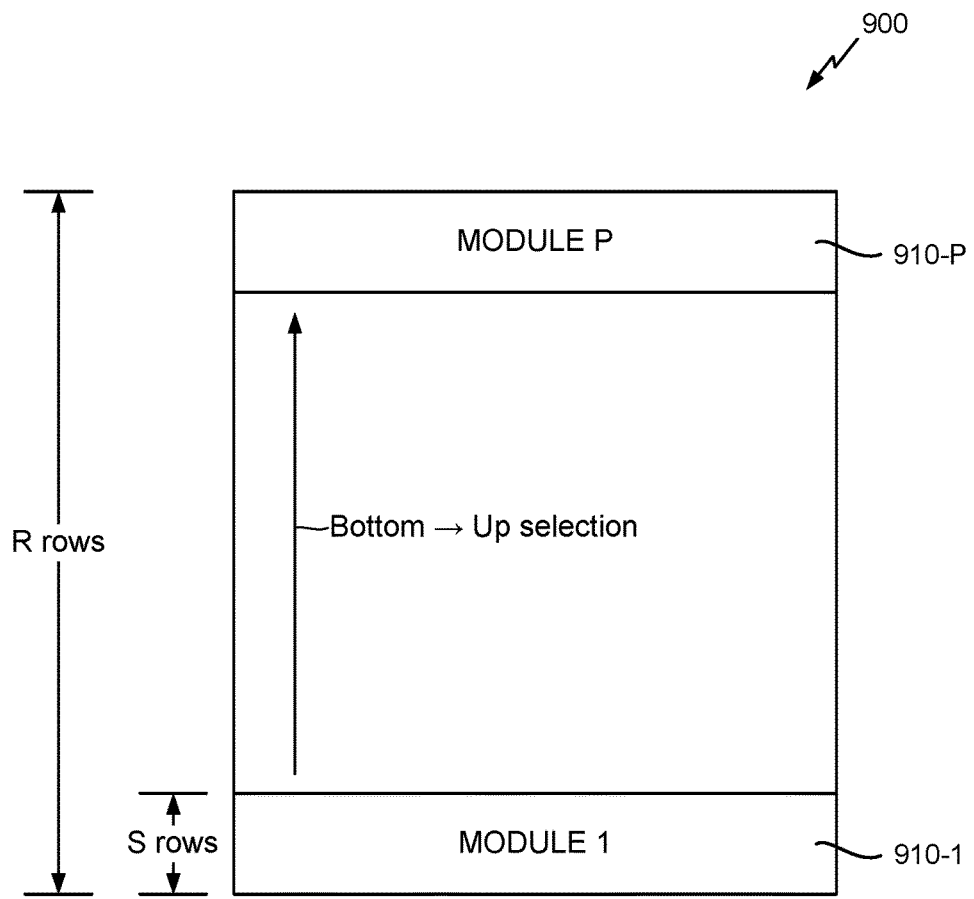
FIGS. 9 and 10 illustrate an example implementation of an intra-picker according to a non-limiting aspect of the disclosure.
Figure 10:
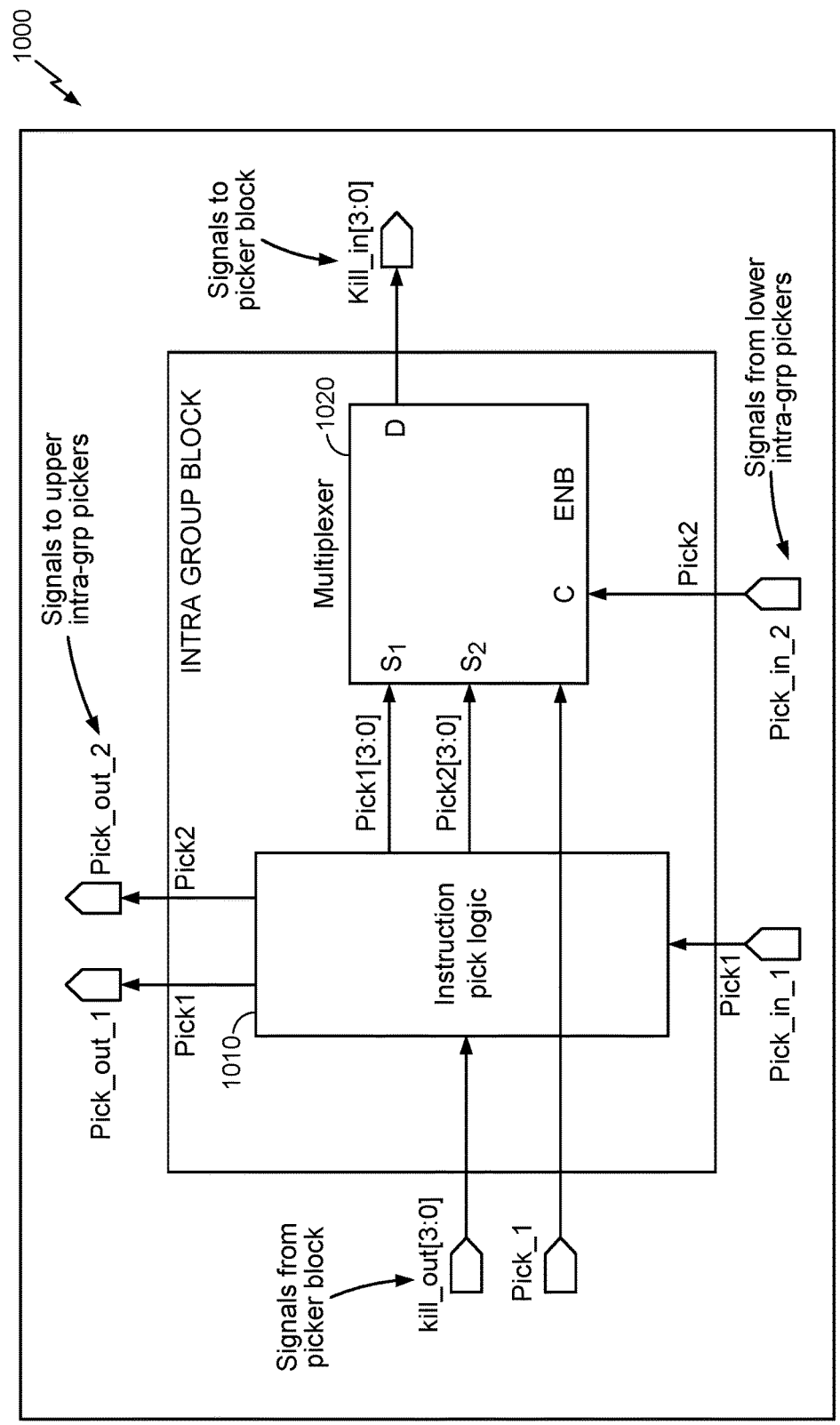

FIGS. 9 and 10 illustrate an example implementation of an intra-group picker. As the name implies, an intra-group picker may pick one or more instructions from a group associated with that intra-group picker. Recall from above that the proposed picker block (e.g., a combination of inter-group picker(s) and intra-group picker(s)) can dispatch one instruction from each of two ready groups (when there are two or more ready groups), and dispatch two instructions from a single ready group (when there is only one ready group). Within a particular intra-group picker, these requirements may be translated as follows:

When there is another ready group, pick one instruction from the associated group;
If there is no other ready group, then pick up to two instructions from the associated group.

As discussed above, one approach to arrange instructions is to implicitly indicate their ages by their row positions—oldest at the bottom row and newest at the top row. If the older ready instructions are to be prioritized, then it would be desirable to pick the ready instructions bottom→up. However, the bottom→up approach can cause a ripple through all rows of the picker block. If the window size is too large, the delay due to the ripple may not be acceptable. To address this, the instruction picking may be split among plural modules where each module picks from a subset of the rows as illustrated in FIG. 9. In this figure, an intra-group column 900 with a total of R rows is visualized. There may be P modules 910 with S rows (S=R/P) for each module 910-$p$, where p=1, 2, . . . P. Each module 910-$p$ may pick from S instructions. For example, if R=48 and P=12, then each group may comprise S=4 instructions, and each module 910-$p$ may pick one or two instructions from its associated group for dispatch. Each module 910-$p$ may correspond to an intra-group picker capable of picking any number of ready instructions (up to S) for dispatch from its associated group of instructions.

FIG. 10 illustrates an example of an intra-group picker 1000. The intra-group picker 1000 may be used as one of the modules 910-$p$ of FIG. 9. For explanation purposes, it is assumed that R=48 and P=12 in FIG. 10 meaning that S=4 number of instructions (indexed as [3:0]) are in each group. Of course, R and P can take on any values. The intra-group picker 1000 may pick one or two instructions based on the following inputs:

Number of instructions bidding in the associated group (kill_out[3:0] signals);
Number of instructions already picked in lower intra-group pickers (pick_in_1, pick_in_2 signals);
Whether or not there are other ready groups (pick_1 signal).

As seen, the intra-group picker 1000 may include an instruction picker 1010 configured to pick any number of ready instructions up to N=2 in its group for dispatch based on signals received from the inter-group picker (e.g., kill_out[3:0], pick_1, see also FIG. 8) and from a lower intra-group picker (e.g., pick_in_1). The instruction picker 1010 may generate signals (pick_out_1, pick_out_2) provided to a higher intra-group picker to indicate how many instructions picked by the intra-group picker 1000 and by the lower intra-group picker(s). These signals correspond to the pick_in_1, pick_in_2 signals to the higher intra-group picker. The intra-group picker 1000 may also include a multiplexer (MUX) 1020 configured to output signals (e.g., kill_in[3:0]) to the inter-group picker based on the picked instructions (e.g., pick1[3:0], pick2[3:0]), and signals received from the inter-group picker (e.g., pick_1, see also FIG. 8) and from the lower intra-group picker (e.g., pick_in_2).

Figure 11:
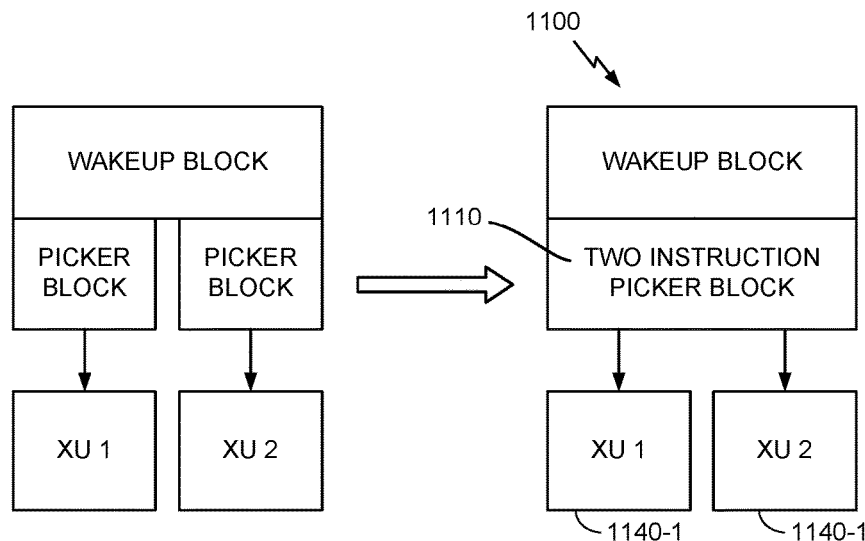
FIG. 11 illustrates a transition from a conventional scheduler to a scheduler according to a non-limiting aspect of the disclosure.

FIG. 11 illustrates a transition from the conventional scheduler to a scheduler of an embodiment of the present disclosure. The example scheduler 1100 embodiment comprises a two instruction picker block 1110 that can dispatch two instructions per cycle to execution units XUs 1140 (1140-1, 1140-2). One advantage (of which there could be several) of the two instruction picker block 1110 is that whenever there are multiple ready instructions (whether within a single group, or across two groups), two instructions can be dispatched in one cycle. This is not true of the conventional scheduler.

Note that the two instruction picker block 1110 is merely exemplary. The two instruction picker block 1110 can be generalized to an N instruction picker block in which the picker block is capable of dispatching up to N instructions in one cycle, where N≥2. Also, there can be several N instruction picker blocks for a scheduler. In addition, the number of instructions that each instruction picker block need not be the same for all instruction picker blocks.

Figure 12:
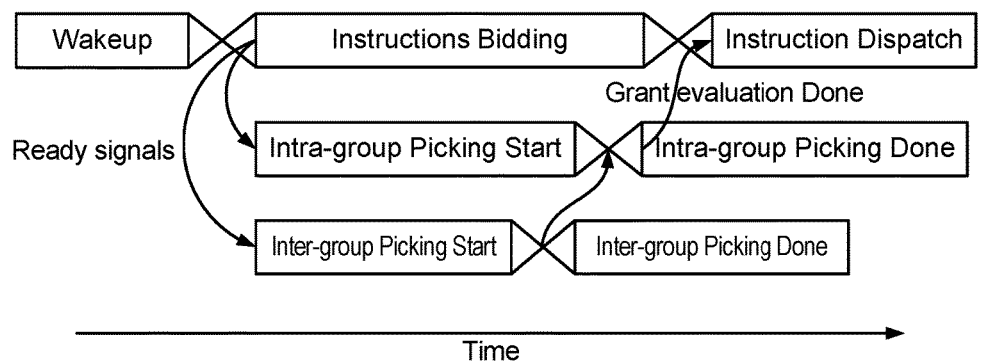
FIG. 12 illustrates timing of operations of inter-group and intra-group pickers.

FIG. 12 illustrates a timeline illustrating that inter-group and intra-group arbitrations may occur in parallel. As seen, the inter-group and intra-group arbitrations may start simultaneously or substantially simultaneously, and their operations may overlap. Then the results of the operations may be combined to dispatch the instructions. Recall that with reference FIGS. 9 and 10, there can be plural intra-group pickers 1000 each associated with a group of instructions. Each intra-group picker 1000 may speculatively pick two ready instructions from its associated group (assuming that there are two or more ready instructions in the group). If there are multiple ready groups (i.e., the associated group is not the only ready group), then the intra-group picker 1000 may drop one of the ready instructions. In FIG. 12, the signal arrow from the end of inter-group picking to the intra-group picking indicates whether there are multiple ready groups. This notification may come in the form of the "pick_1" signal (output of the NAND gate 820) shown in FIG. 8. In other words, the inter-group picker can indicate to the intra-group 1000 picker to pick either one or two ready instructions.

Figure 13:
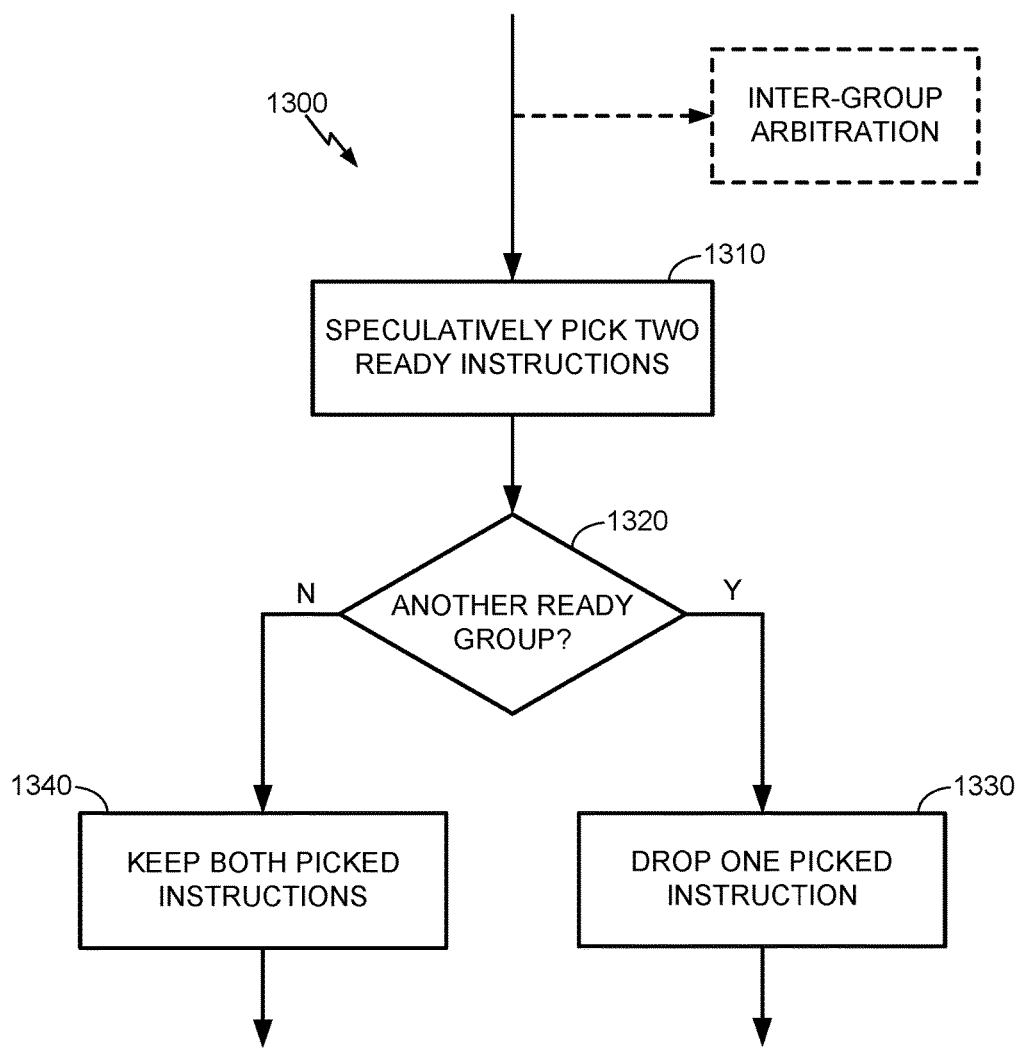
FIG. 13 illustrates a flow chart of a process performed by an intra-group picker block to pick ready instructions for dispatch.

FIG. 13 illustrates a flow chart of an example process that the intra-group picker 1000 may perform. In 1310, the intra-group picker 1000 may speculatively pick two ready instructions from its associated group. In 1320, the intra-group picker 1000 may determine whether or not there is another ready group. For example, the intra-group picker 1000 may be notified by the inter-group picker. If so, then in 1330, the intra-group picker 1000 may drop one of the picked instructions. If there is no other ready group, i.e., if the associated group is the only ready group, then in 1340, both speculatively picked instructions may be kept for dispatch.

Note that there is a dashed arrow leading to a box labeled "inter-group arbitration". This is to indicate that preferably, the inter-group picker process is initiated simultaneously or substantially simultaneously with the initiation of the inter-group processing. In this way, the inter-group and intra-group arbitrations occur in parallel, e.g., overlap in time.

Figure 14:
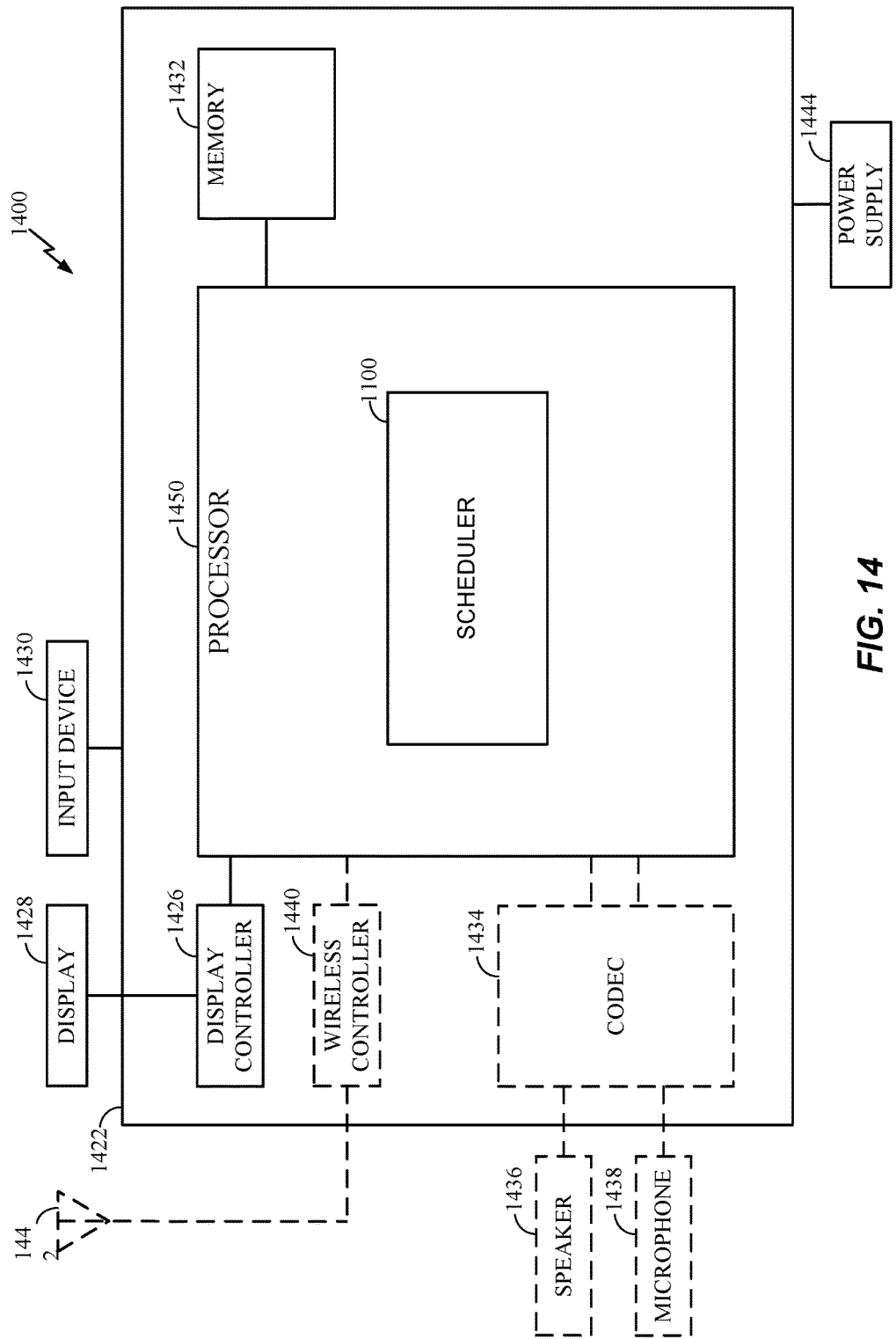
FIG. 14 illustrates an exemplary computing device, in which an aspect of the disclosure may be advantageously employed.

Referring now to FIG. 14, a block diagram of a computing device that is configured according to exemplary aspects is depicted and generally designated 1400. In some aspects, computing device 1400 may be configured as a wireless communication device. As shown, computing device 1400 includes processor 1450, which may be configured to implement method 600 of FIG. 6, method 700 of FIG. 7, and/or method 1300 of FIG. 13 in some aspects. Processor 1450 may comprise a scheduler such as the scheduler 1100 that comprises the example inter and intra-group pickers as discussed above. Processor 1450 may be communicatively coupled to memory 1432. Computing device 1400 also include display 1428 and display controller 1426, with the display controller 1426 coupled to processor 1450 and to display 1428.

In some aspects, FIG. 14 may include some optional blocks showed with dashed lines. For example, the computing device 1400 may optionally include coder/decoder (CODEC) 1434 (e.g., an audio and/or voice CODEC) coupled to processor 1450; speaker 336 and microphone 1438 coupled to CODEC 334; and wireless controller 1440 (which may include a modem) coupled to wireless antenna 1442 and to processor 1450.

In a particular aspect, where one or more of the above-mentioned optional blocks are present, processor 1450, display controller 1426, memory 1432, CODEC 1434, and wireless controller 1440 can be included in a system-in-package or system-on-chip device 1422. Input device 1430, power supply 1444, display 1428, input device 1430, speaker 1436, microphone 1438, wireless antenna 1442, and power supply 1444 may be external to system-on-chip device 1422 and may be coupled to a component of system-on-chip device 1422, such as an interface or a controller.

It should be noted that although FIG. 14 depicts a computing device, processor 1450 and memory 1432 may also be integrated into a server, a set top box, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method of forming a semiconductor device. Accordingly, the scope of the disclosed subject matter is not limited to illustrated examples and any means for performing the functionality described herein are included.

While the foregoing disclosure shows illustrative embodiments, it should be noted that various changes and modifications could be made herein without departing from the scope of the disclosed subject matter as defined by the appended claims. The functions, processes and/or actions of the method claims in accordance with the embodiments of the disclosed subject matter described herein need not be performed in any particular order. Furthermore, although elements of the disclosed subject matter may be described or claimed in the singular, the plural is contemplated unless limitation to the singular is explicitly stated.

What is claimed is:

1. A method of picking instruction in a scheduler, the method comprising:
    picking, by an inter-group picker of the scheduler, ready groups such that
        multiple ready groups are picked when there are two or more ready groups among a plurality of groups, each group including one or more instructions, each ready group being a group with at least one of the one or more instructions being a ready instruction, each ready instruction being an instruction that has all of its operands available such that the instruction is enabled to bid for execution by an execution unit of a processor core, and
        a single ready group is picked when the single ready group is the only ready group among the plurality of groups; and
    picking, by an intra-group picker of the scheduler, ready instructions such that
        one ready instruction is picked from each of the multiple ready groups when the multiple ready groups are picked, and
        multiple ready instructions are picked from the single ready group when the single ready group is picked,
    wherein the scheduler is a scheduler of the processor core, and
    wherein the inter-group picker and the intra-group picker are implemented in hardware.

2. The method of claim 1, picking the ready groups and picking the ready instructions occurring in parallel.

3. The method of claim 1, picking the ready instructions comprising picking the ready instructions in an order of priority.

4. The method of claim 3, the order of priority being from an oldest ready instruction to a newest ready instruction.

5. The method of claim 1,
    picking the multiple ready groups comprising picking an oldest ready group and a newest ready group when there are two or more ready groups among the plurality of groups,
    picking the one ready instruction each from each of the multiple ready groups comprising picking one ready instruction from each of the oldest and newest ready groups, and
    picking the multiple ready instructions from the single ready group comprising picking up to two ready instructions from the single ready group.

6. The method of claim 5, further comprising setting a grant new line of an inter-group picker of the scheduler when a group associated with the grant new line is the newest ready group.

7. The method of claim 6, further comprising replacing a first ready instruction of an existing newest group on the grant new line with a second ready instruction of a group that is newer than the existing newest group.

8. The method of claim 6, further comprising setting a grant old line of the inter-group picker of the scheduler when a group associated with the grant old line is the oldest ready group.

9. The method of claim 8, further comprising replacing a first ready instruction of an existing oldest group on the grant old line with a second ready instruction of a group that is older than the existing oldest group.

10. The method of claim 8, further comprising the inter-group picker indicating to an intra-group picker to pick either one or two instructions based on the grant new line and the grant old line.

11. The method of claim 5, picking the ready instructions comprising picking one or two ready instructions from a group associated with an intra-group picker based on any combination of the following:
   a number of instructions bidding in the associated group,
   a number of instructions already picked by lower intra-group picker(s), and
   whether or not there are ready groups other than the associated group,
   wherein each lower intra-group picker is associated with a group whose instructions have greater priorities than the instructions of the associated group.

12. The method of claim 11, further comprising the intra-group picker notifying a higher intra-group picker a number of instructions picked by the intra-group picker and the lower intra-group picker(s),
   wherein the higher intra-group picker is associated with a group whose instructions have lesser priorities than the instructions of the associated group.

13. A non-transitory computer-readable medium having a code recorded thereon that causes a computer to perform a method of picking instruction in a scheduler, the method comprising:
   picking, by an inter-group picker of a scheduler, ready groups such that
      multiple ready groups are picked when there are two or more ready groups among a plurality of groups, each group including one or more instructions, each ready group being a group with at least one of the one or more instructions being a ready instruction, each ready instruction being an instruction that has all of its operands available such that the instruction is enabled to bid for execution by an execution unit of a processor core, and
      a single ready group is picked when the single ready group is the only ready group among the plurality of groups; and
   picking, by an intra-group picker of the scheduler, ready instructions such that
      one ready instruction is picked from each of the multiple ready groups when the multiple ready groups are picked, and
      multiple ready instructions are picked from the single ready group when the single ready group is picked.

14. A scheduler, comprising:
   an inter-group picker configured to pick:
      multiple ready groups when there are two or more ready groups among a plurality of groups, each group including one or more instructions, each ready group being a group with at least one of the one or more instructions being a ready instruction, each ready instruction being an instruction that has all of its operands available such that the instruction is enabled to bid for execution by an execution unit of a processor core, and
      a single ready group when the single ready group is the only ready group among the plurality of groups; and
   an intra-group picker configured to pick:
      one ready instruction from each of the multiple ready groups when the inter-group picker picks the multiple ready groups, and
      multiple ready instructions from the single ready group when the inter-group picker picks the single ready group,
   wherein the scheduler is a scheduler of the processor core, and
   wherein the inter-group picker and the intra-group picker are implemented in hardware.

15. The scheduler of claim 1, the inter-group picker being configured to pick the ready groups and the intra-group picker being configured to pick the ready instructions in parallel.

16. The scheduler of claim 1, the intra-group picker being configured to pick the ready instructions in an order of priority.

17. The scheduler of claim 16, the order of priority being from an oldest ready instruction to a newest ready instruction.

18. The scheduler of claim 1,
   the inter-group picker being configured to pick an oldest ready group and a newest ready group when there are two or more ready groups among the plurality of groups, and
   the intra-group picker being configured to pick:
      one ready instruction from each of the oldest and newest ready groups when the inter-group picker picks the oldest and newest ready groups, and
      up to two ready instructions the single ready group when the inter-group picker picks the single ready group.

19. The scheduler of claim 18, the inter-group picker comprising a grant new line which when evaluated as being set indicates that a group associated with the grant new line is the newest ready group.

20. The scheduler of claim 19, the inter-group picker being configured to replace a first ready instruction of an existing newest group on the grant new line by a second ready instruction of a group that is newer than the existing newest group in a next cycle.

21. The scheduler of claim 19, the inter-group picker further comprising a grant old line which when evaluated as being set indicates that a group associated with the grant old line is the oldest ready group.

22. The scheduler of claim 21, a first ready instruction of an existing oldest group on the grant old line being replaced by a second ready instruction of a group that is older than the existing oldest group.

23. The scheduler of claim 21, the inter-group picker comprising an indicator to indicate to the intra-group picker to pick either one or two instructions based on the grant new line and the grant old line.

24. The scheduler of claim 23, the indicator comprising a NAND gate having inputs coupled to the grant new line and the grant old line.

25. The scheduler of claim 18, the intra-group picker being configured to pick one or two ready instructions from a group associated with the intra-group picker based on any combination of the following:

a number of instructions bidding in the associated group,
a number of instructions already picked by lower intra-group picker(s), and
whether or not there are ready groups other than the associated group,
   wherein each lower intra-group picker is associated with a group whose instructions have greater priorities than the instructions of the associated group.

26. The scheduler of claim 25, the intra-group picker being configured to notify a higher intra-group picker a number of instructions picked by the intra-group picker and the lower intra-group picker(s),
   wherein the higher intra-group picker is associated with a group whose instructions have lesser priorities than the instructions of the associated group.

27. A scheduler, comprising:
   means for inter-group picking that picks
      multiple ready groups when there are two or more ready groups among a plurality of groups, each group including one or more instructions, each ready group being a group with at least one of the one or more instructions being a ready instruction, each ready instruction being an instruction that has all of its operands available such that the instruction is enabled to bid for execution by an execution unit of a processor core, and
      a single ready group when the single ready group is the only ready group among the plurality of groups; and
   means for intra-group picking that picks
      one ready instruction from each of the multiple ready groups when the means for inter-group picking picks the multiple ready groups, and
      multiple ready instructions from the single ready group when the means for inter-group picking picks the single ready group,
   wherein the scheduler is a scheduler of the processor core, and
   wherein the means for inter-group picking and the means for intra-group picking are implemented in hardware.

28. The scheduler of claim 27, wherein the means for inter-group picking and the means for intra-group picking operates in parallel.

29. The scheduler of claim 27,
   wherein the means for inter-group picking picks an oldest ready group and a newest ready group when there are two or more ready groups among the plurality of groups, and
   wherein the means for intra-group picking picks
      one ready instruction from each of the oldest and newest ready groups when the means for inter-group picking picks the oldest and newest ready groups, and
      up to two ready instructions the single ready group when the means for inter-group picking picks the single ready group.

30. The scheduler of claim 29, wherein the means for intra-group picking picks one or two ready instructions from a group associated with the means for intra-group picking based on any combination of the following:
   a number of instructions bidding in the associated group,
   a number of instructions already picked by lower means for intra-group picking, and
   whether or not there are ready groups other than the associated group,
      wherein the lower means for intra-group picking is associated with a group whose instructions have greater priorities than the instructions of the associated group.

31. A scheduler, comprising:
   a plurality of intra-group pickers that are together configured to pick multiple ready instructions per cycle for dispatch,
   wherein there are a plurality of instructions divided into a plurality of groups, each group including one or more instructions,
   wherein a group is a ready group when at least one of the one or more instructions in the group is a ready instruction, each ready instruction being an instruction that has all of its operands available such that the instruction is enabled to bid for execution by an execution unit of a processor core,
   wherein the plurality of intra-group pickers are associated with the plurality of groups hierarchically such that for each intra-group picker, there is one or both of a lower intra-group picker and a higher intra-group picker,
   wherein each intra-group picker is configured to
      pick multiple ready instructions from that associated group when
         none of the lower intra-group pickers pick instructions from their associated groups, and
         there are multiple ready instructions in that associated group, and
      pick a single ready instruction from that associated group when
         at least one of the lower intra-group pickers picks an instruction from its associated group, and
         there is at least one ready instructions in that associated group, and
   wherein for each intra-group picker, the lower intra-group picker is associated with a group whose instructions have greater priorities than the instructions of the group associated with that intra-group picker, and the higher intra-group picker is associated with a group whose instructions have lesser priorities than the instructions of the associated that intra-group picker.

* * * * *